United States Patent
Simanjuntak et al.

(10) Patent No.: US 12,443,625 B2
(45) Date of Patent: Oct. 14, 2025

(54) ARCHIVING A TABLE IN A DATA ANALYSIS SYSTEM

(71) Applicant: INTERNATIONAL BUSINESS MACHINES CORPORATION, Armonk, NY (US)

(72) Inventors: Manogari Nogi Simanjuntak, San Jose, CA (US); Sowmya Kameswaran, San Jose, CA (US); Björn Broll, Waldenbuch (DE); Daniel Martin, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 18/303,810

(22) Filed: Apr. 20, 2023

(65) Prior Publication Data

US 2024/0320237 A1 Sep. 26, 2024

(51) Int. Cl.
*G06F 16/27* (2019.01)
*G06F 16/215* (2019.01)
(Continued)

(52) U.S. Cl.
CPC .......... *G06F 16/278* (2019.01); *G06F 16/215* (2019.01); *G06F 16/2343* (2019.01);
(Continued)

(58) Field of Classification Search
CPC .............. G06F 16/278; G06F 16/2379; G06F 16/2343; G06F 16/215; G06F 16/2445; G06F 16/24554
(Continued)

(56) References Cited

U.S. PATENT DOCUMENTS 6,728,709 B1 * 4/2004 Plasek ................. G06F 16/2343
8,874,512 B2 10/2014 Jin et al.
(Continued)

FOREIGN PATENT DOCUMENTS

CN 103617176 A 3/2014
WO 2021184679 A1 9/2021

OTHER PUBLICATIONS

International Searching Authority, "Notification of Transmittal of the international Search Report and the Written Opinion of the International Searching Authority, or Declaration," Patent Cooperation Treaty, Sep. 22, 2023, 3 pages, International Application No. GB2304143.7.

*Primary Examiner* — Kimberly L Wilson
(74) *Attorney, Agent, or Firm* — Elliot J. Shine

(57) ABSTRACT

An embodiment for archiving data in a data analysis system. The embodiment may receive a request to archive a source partition of a source table of source database system of the data analysis system. The embodiment may determine whether the source table is partitioned into partitions by ranges of an attribute of the source table. The embodiment may, in response to determining that the source table is partitioned by range, lock the source partition to prevent changes of the source partition. The embodiment may determine whether the source partition is synchronized with a corresponding partition in the target table. In response to determining that the source partition is synchronized with the corresponding partition in the target table, the embodiment may remove data in the source partition from the source table.

20 Claims, 7 Drawing Sheets

(51) Int. Cl.
*G06F 16/23* (2019.01)
*G06F 16/242* (2019.01)
*G06F 16/2455* (2019.01)

(52) U.S. Cl.
CPC ...... *G06F 16/2379* (2019.01); *G06F 16/2445* (2019.01); *G06F 16/24554* (2019.01)

(58) Field of Classification Search
USPC ........................................................ 707/607
See application file for complete search history.

(56) References Cited

U.S. PATENT DOCUMENTS

| | | |
|---|---|---|
| 10,013,312 B2 | 7/2018 | Broll |
| 10,216,739 B2 | 2/2019 | Broll |
| 10,282,363 B2 | 5/2019 | Hrle |
| 10,838,934 B2 | 11/2020 | Becker et al. |
| 11,263,235 B2 | 3/2022 | Hrle |
| 11,294,892 B2 | 4/2022 | Oliveira Lizardo |
| 11,327,958 B2 | 5/2022 | Lee |
| 11,360,998 B2 | 6/2022 | Hrle |
| 2007/0198591 A1* | 8/2007 | Teng .................... G06F 16/2282 |
| 2009/0083341 A1 | 3/2009 | Parees |
| 2015/0106407 A1* | 4/2015 | Adayilamuriyil ... G06F 16/2282 707/804 |
| 2015/0242451 A1* | 8/2015 | Bensberg .............. G06F 16/278 707/615 |
| 2016/0179919 A1 | 6/2016 | Martin |
| 2017/0293540 A1* | 10/2017 | Mehta .................... G06F 11/14 |
| 2019/0220467 A1 | 7/2019 | Hrle |
| 2019/0325055 A1 | 10/2019 | Lee |
| 2020/0034365 A1 | 1/2020 | Martin |
| 2020/0394182 A1 | 12/2020 | Lee |
| 2021/0406259 A1 | 12/2021 | Oliveira Lizardo |
| 2024/0134840 A1* | 4/2024 | Kong ..................... G06F 16/27 |

* cited by examiner

ARCHIVING A TABLE IN A DATA ANALYSIS SYSTEM

BACKGROUND

The present invention relates generally to the field of digital computer systems, and more specifically, to a method for archiving a table.

Large modern applications require access to most recent data irrespective of whether they provide support for operational (OLTP) or analytical (OLAP) business processes. Traditional database management systems (DBMS) cannot individually support this requirement because they specialize either for operational or for analytical workloads, therefore at least two of them are needed for meeting the applications needs. As soon as two or more DBMSs are involved in serving the application requests the problem of data coherency arises. Namely, the different DBMSs operate on their own copies of data and keeping these copies coherent is a major challenge.

SUMMARY

Various embodiments provide a method for archiving a table, computer program product and system as described by the subject matter of the independent claims. Additional embodiments are described in the dependent claims. Embodiments of the present disclosure may be freely combined with each other if they are not mutually exclusive.

In one aspect, the present disclosure relates to a method for archiving data in a data analysis system, the data analysis system including a source database system and a target database system, the source database system including a source table, the source table being partitioned into source partitions by ranges of an attribute of the source table, the target database system including a target table corresponding to the source table, wherein a data synchronization in the data analysis system enables a replication of data of the source table from the source database system to the target database system. The method includes receiving a request to archive a source partition of the source table, determining whether the source table is partitioned into partitions by ranges of an attribute of the source table, in response to determining that the source table is partitioned by range: locking the source partition for preventing changes of the source partition, determining whether the source partition is synchronized with a corresponding partition in the target table, and in response to determining that the source partition is synchronized with the corresponding partition in the target table removing data of the source partition from the source table.

In one aspect the present disclosure relates to a computer program product including a computer-readable storage medium having computer-readable program code embodied therewith, the computer-readable program code configured to implement the method of the above embodiment.

In one aspect, the present disclosure relates to a source database system for a data analysis system, the data analysis system including a target database system, the source database system including a source table, the source table being partitioned into source partitions by ranges of an attribute of the source table. The source database system is configured for receiving a request to archive a source partition of the source table, determining whether the source table is partitioned into partitions by ranges of an attribute of the source table, in response to determining that the source table is partitioned by range, locking the source partition for preventing changes of the source partition, determining whether the source partition is synchronized with a corresponding partition in a target table in the target database system, and in response to determining that the source partition is synchronized with the corresponding partition in the target table, removing data of the source partition from the source table.

BRIEF DESCRIPTION OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
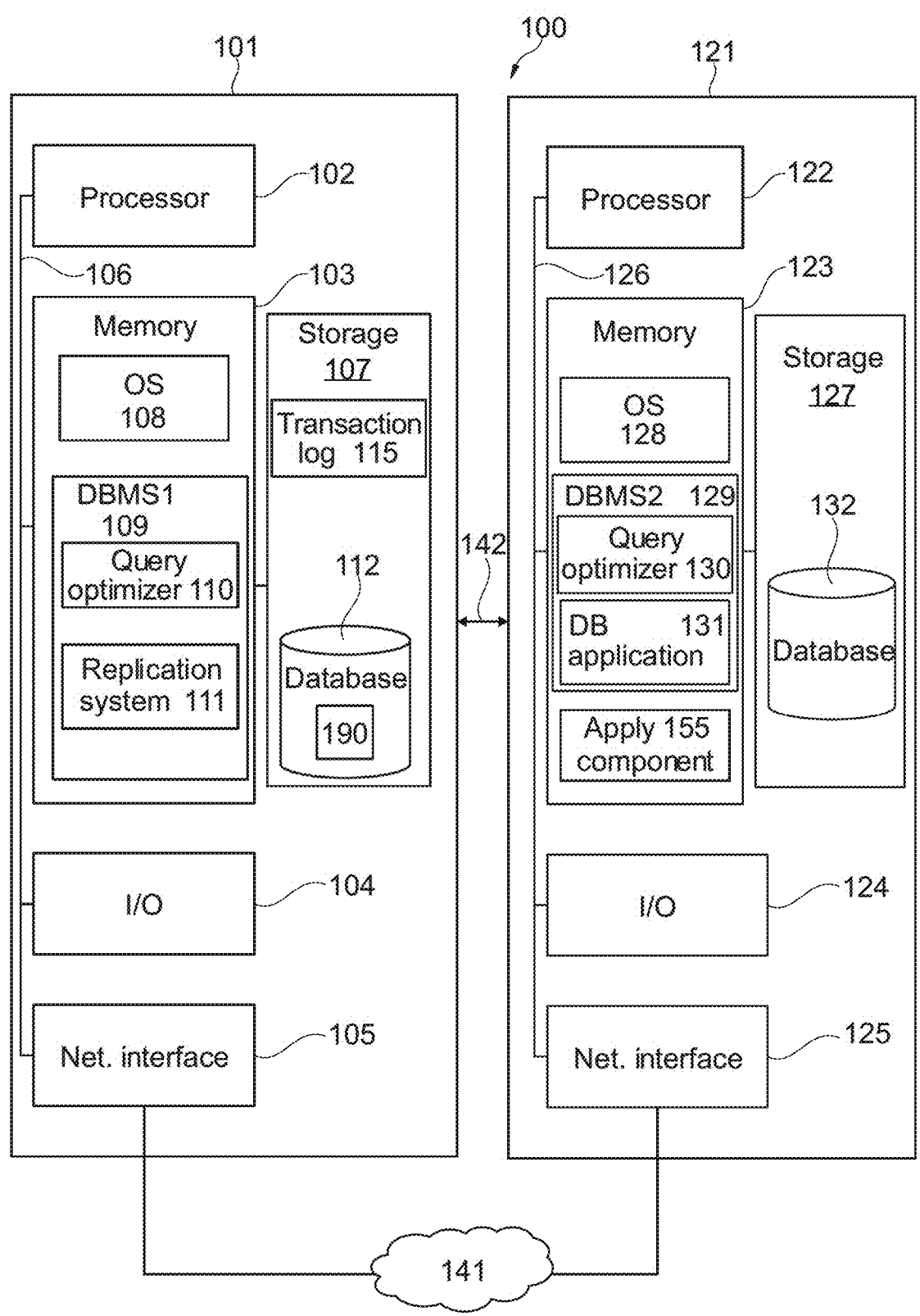
FIG. 1 illustrates a diagram of a data analysis system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The data analysis system of described embodiments may include a source database system and a target database system. The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may, for example, be a transactional engine and the target database system may be an analytical engine. For example, the source database system may be an online transaction processing (OLTP) system and the target database system may be one or more online analytical processing (OLAP) systems. The source database system may include a source dataset and the target database system may include a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The source dataset may include tables, referred to as source tables, and the target dataset may include corresponding target tables. The content of the source dataset may be changed by one or more database transactions. The data analysis system may be configured to synchronize the content of the source tables of the source database system with the corresponding target tables of the target database system. For example, data may be replicated asynchronously from the source database system to the target database system and each update may be marked with a timestamp from the source database system. Therefore, it may be determined at which point that data (e.g., of a given source table) in the target database system is consistent with the source database system.

In embodiments, the synchronization may be performed using one or more synchronization programs. The synchronization programs may, for example, include a load program and a replication program. The two programs may differ in the amount and frequency of copying data from a source table to a target table. The load program may copy the whole content of the source table into corresponding target table. The replication program may replicate individual changes from a source table to a corresponding target table by inspecting a transaction log of the source database system. Thus, the data change (also referred to as change) that is propagated using the load program may be referred to as a loaded data change and the data change that is propagated using the replication program may be referred to as incremental change. The transaction logging may also be performed at the target database system by maintaining a primary target transaction log.

In embodiments, the source table and target table may be partitioned by range of values of a given attribute of the source table. The given attribute may, for example, represent one or more key columns of the source table. For example, table partitioning may use a data organization scheme in which table data is divided across multiple storage objects, called data partitions or ranges, according to values in one or more table partitioning key columns of the table. These storage objects may be in different table spaces, in the same table space, or a combination of both. For example, a table partition may be an independent part of with its own data, configuration files, indexes, and transaction logs. A partition may be a physical partition stored in a respective machine. Alternatively, the partitions may be referred to as logical partitions if they share the machine's resources. The replication program may support tables that are partitioned by range and perform replication partition wise to replicate changes from any partition. A data partition is part of a table, containing a subset of rows of a table, and stored separately from other sets of rows.

In embodiments, presently described methods may archive data seamlessly using replication technology between the source database system and target database system. In this fashion, the process of archiving data is an operation to make sure that the target system(s) is consistent on a particular syncpoint, and the data partition in the source database system can be purged to save storage in the source database system and further optimize OLTP type transactions. Thus, without having to explicitly execute an archive command as usual using dedicated archive storages at the source database system, the presently described method make use of replicated data in the target database system as an archive version of data in the source database system. Presently described embodiments may thus save processing resources for archive processes compared to existing techniques.

Data of a table partition that is archived may be referred to as archived data while data of the non-archived partitions may be referred to as active data. For example, OLTP queries to be executed on the source database system may only run against data in the active partitions (e.g., banking records for the past year) while the target database system may run OLAP or other queries requiring the whole range of data or just the active data.

According to one example, the method further includes: receiving a query referencing the whole range of the source table and offloading the query to the target database system for executing the query at the target database system on the target table that comprises the archived and non-archived partitions of the source table. Additionally described embodiments may provide an optimized way to data organization and synchronization in the case of using the target DBMS to archive data from source DBMS and provide the ability to query said data in a performant way. The present subject matter may enable a "global", "consolidated" and "holistic" view on the available data.

According to another embodiment, the method may further include: creating a first database view (V1) representing the non-archived partitions, and a second database view (V2) representing the archived and non-archived partitions, wherein the execution of the query is performed using the other database view.

A view or database view refers to a virtual table whose contents are defined by a query on a base table. For example, the query associated with the created database view V1 may have a selection statement for selecting the non-archived partitions of the target table. The query associated with the created database view V2 may have a selection statement for selecting both the archived and the non-archived partitions of the target table. This example may prevent having one database view for archive data only and one database view for active data only. This may prevent that a user query that needs active and archive data is executed as a join between the two views to source the result. Maintaining a single view of all data including archived and active data may avoid having to run joins between two views when queries that come in request data from both active and archive partitions. This may save resources and improve performance.

According to one example, each database view is associated with predicates to indicate whether the database view has archived partitions, wherein the execution of the query is performed using the predicates. A predicate is a condition expression that evaluates to a Boolean value, either true or false. This may simplify processing of data and save resources based on the views as there may be no-need to (re)code the conditions of the predicates every time the views are accessed.

On the target database system, two table views can be created with predicates to indicate: 1) A view of the table of only data from the active partitions and 2) A view of the table of data from all partitions. Furthermore, view statistics can be collected for each of the view to optimize performance of queries going against the view. Another advantage may be the use of a view for active data and one for full data (including active and archived data) which avoids joins in queries which request active and archive data that resulting is better performance.

According to one example, the first database view is created upon receiving the archive request and before creating the second database view. This may enable to execute queries on the noon-archived portions while or before the second view is created. According to one example, the second database view is created in response to removing data in the source partition. The source partition may be empty as its data is removed.

According to another embodiment, determining whether the source partition is synchronized with the corresponding partition of the target table may include determining whether the data synchronization between the source database system and the target database system is automatically enabled. In response to determining that the automatic data synchronization between the source database system and the target database system is enabled, described embodiments may determine whether all changes made to the source table until the request is received are propagated to the target database system. The source partition may be synchronized with the corresponding partition in the target table because the whole source table may be synchronized with the target table. This may enable all partitions to be synchronized.

In response to determining that the automatic data synchronization between the source database system and the target database system is not enabled, the source partition may be loaded to the target database system, thereby determining that the source partition is synchronized with the corresponding partition of the target table. This may result in archived source partitions being in sync with the corresponding target partition. For example, if the replication was not enabled prior to archiving, a Load/Reload may be initiated on the target database system from the source database system.

According to another embodiment, determining whether all changes made until the request is received are propagated may include: sending a timestamp of a latest commit of the source table to the target database system, receiving a synchronization confirmation from the target database system in response to sending the timestamp, and determining that the source table is synchronized with the target table in response to receiving the synchronization confirmation. Indeed, with replication enabled, the replication timestamp may be validated on the target to wait until all data in target is in sync with the source.

This example may thus enable usage of replication to keep data in sync between source as target in conjunction with archiving solutions. For example, with OLAP target DBMSs that support updatable views, enabling replication for the table partitions that are active on the source DBMS, may allow the views created on the target for the active data also to be updated with the most recent. Furthermore, view statistics can be collected for each of the view to optimize performance of queries going against the view.

In another embodiment, the method may further include receiving a query referencing the non-archived partitions of the source table, and executing the query in the source database system on the non-archived partitions or offloading the query to the target database system for executing the query at the target database system on the non-archived partitions. This may enable a flexible method for execution of the queries on active data.

For example, if an application queries the data analysis system for active data, the data analysis system can decide whether it can be best executed on either the source database system or the target database system. If instead the whole range of data is required for the query, the query may be routed to the target database system.

In yet another embodiment, the locking may further include creating an image copy of the source partition for enabling a recovery of the source table. The image copy may allow to download or copy the source partition into a mainframe dataset. The image copy can be used later for recovery of the source table. The table partitions may be stored in one or more table spaces while the image copies may use another storage type.

For example, following the locking, the source database system may run an UNLOAD utility to unload the data from the source table to disk (image copy) for this source partition. With the UNLOAD utility, the data is not deleted from the source table. The UNLOAD utility just makes a copy of the data. For example, that copy may include the data only; it may not include all of the pages, such as the system pages and header pages.

In embodiments, the moving may also include performing a purge operation of the source partition, unlocking the source partition, and marking the source partition as a read only partition. The purging may save storage reserved for table spaces in the source database system. The source partition may be empty since the data is removed from the source partition. The read only assignment may indicate that the source partition has data that can be read, wherein the data is archived in the target database system.

According to one example, the source database system is an online transaction processing (OLTP) system, the target database system is one or more online analytical processing (OLAP) systems. For example, an OLTP system acts as the source DBMS and one or more OLAP systems act as target DBMS. Data is replicated asynchronously from the source DBMS to the target DBMS and each update may be marked with a timestamp from the source DBMS. Therefore, there can be determined at which point that data in the target system is consistent with the source system.

FIG. 1 is a block diagram for a data analysis system in accordance with an example of the present subject matter. The data analysis system 100 may, for example, include an IBM® Db2® Analytics Accelerator for z/OS® (IDAA) (IBM, DB2, and z/OS are registered trademarks of International Business Machines Corporation in many venues). The data analysis system 100 may include a source database system 101 connected to a target database system 121. The source database system 101 may, for example, include IBM Db2 for z/OS. The target database system 121 may, for example, comprise IBM Db2 Warehouse (Db2 LUW).

Source database system 101 may include a processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.) and non-volatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Figure 6:
FIG. 6 depicts a diagram illustrating a method for archiving table partitions in a data analysis system in accordance with an example of the present subject matter.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may include a first database 112. The first database 112 may, for example, comprise one or more first tables 190. FIG. 6 shows an example source table of the tables 190 as stored in the source database system 101.

Memory 103 may include one or more separate programs e.g., database management system DBMS1 109, each of which includes an ordered listing of executable instructions for implementing logical functions, notably functions involved in embodiments of this invention. The software in memory 103 may also typically include a suitable operating system (OS) 108. The OS 108 essentially controls the execution of other computer programs for implementing at least part of methods as described herein. DBMS1 109 comprises a replication system 111 and a query optimizer 110. The replication system 111 may include a log reader (not shown). The log reader may read log records (also referred to as log entries) of a transaction recovery log 115 of the source database system 101 and provide changed records to the target database system 121. The transaction recovery log 115 may be referred to as primary source transaction log. The usual content of a log record may include a timestamp, log record sequence number (LRSN) and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log records for inserted rows may contain only new column values while transaction log records for deleted rows may contain only old column values. Log records for updated rows may contain the new and old values of all row columns. The order of log records in the primary source transaction log 115 may reflect the order of change operations of the transactions and the order of transaction commit records may reflect the order in which transactions are completed. The type of row operations in log records can, for example, be delete, insert or update. The log reader may read log records from the recovery log, extract relevant modification or change information (inserts/updates/deletes targeting tables in replication). Extracted information may be transmitted (e.g., as a request for application of the change) to target database system 121. The query optimizer 110 may be configured for generating or defining query plans for executing queries e.g., on first database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 129 and apply component 155, each of which comprises an ordered listing of executable instructions for implementing logical functions, notably functions involved in embodiments of this invention. The software in memory 123 may also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g., on a second database 132. The apply component 155 may apply received changes to the second database 132. The apply component 155 may buffer log records sent from the log reader and consolidate the changes into batches to improve efficiency when applying the modifications to the second database 132 via a bulk-load interface. This may enable the performance of replication.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, in embodiments, the source and target database systems may belong to a single system e.g., sharing a same memory and processor hardware, while each of the source and target database systems is associated with a respective DBMS and datasets e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
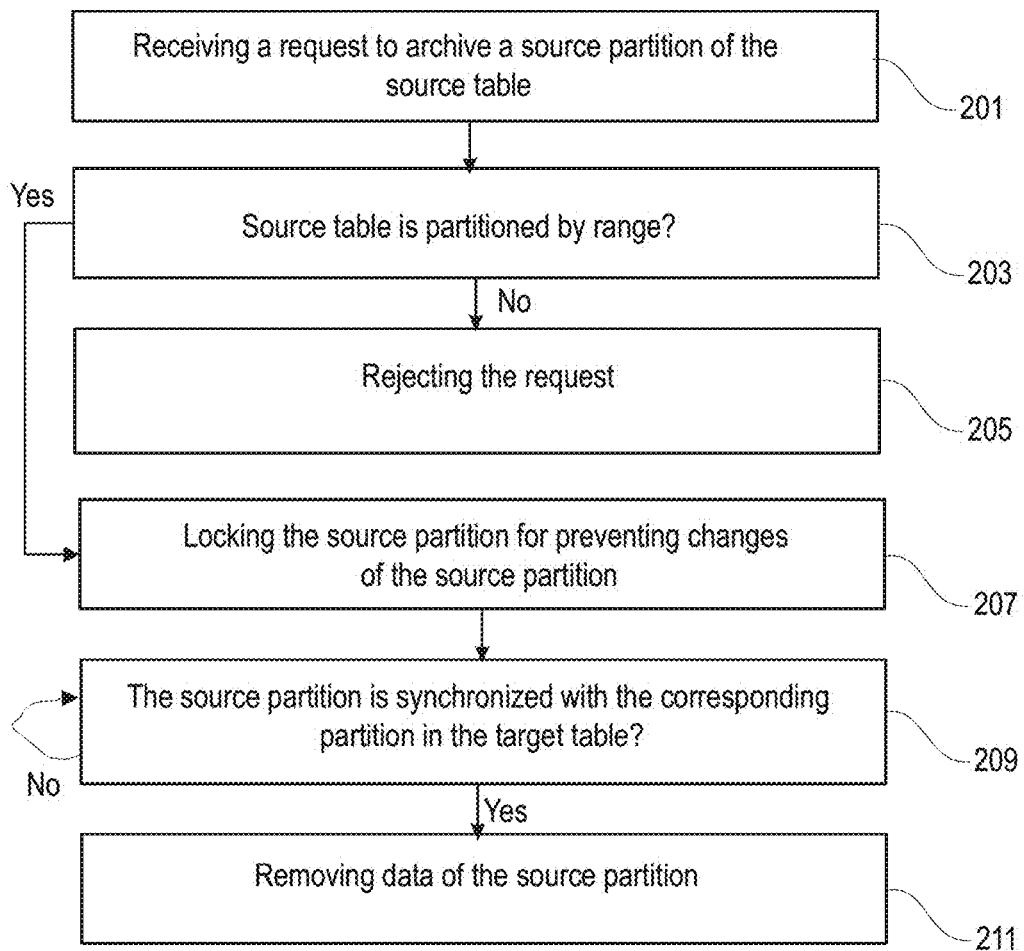
FIG. 2 is a flowchart of a method for archiving a table partition in accordance with an example of the present subject matter.

FIG. 2 is a flowchart of an illustrative method for archiving a table partition in a data analysis system in accordance with an example of the present subject matter. For the purpose of explanation, the method described in FIG. 2 may be implemented in the system illustrated in FIG. 1 but is not limited to this implementation. The method of FIG. 2 may, for example, be performed by the source database system 101.

A request to archive a source partition of the source table may be received in step 201. For example, when an administrator wants to archive a portion of data from the source DMBS, the administrator may trigger the archive request. Alternatively, the request may be received from a computer system.

It may be determined in step 203 whether the source table is partitioned by range. For example, when the archive request or command to archive data for one or more partitions in the source DBMS to the target DBMS is received by the source database system it may be checked if the request is being made on tables with data partitioned by range.

In response to determining that the source table is not partitioned by range, the request may be rejected in step 205. In response to determining that the source table is partitioned by range, steps 207 to 211 may be performed.

The source partition may be locked in step 207 for preventing changes of the source partition. For example, if the table is partitioned by range, then the source DBMS locks the partitions to be archived to avoid further incoming updates. Following the locking, the source DBMS may run an UNLOAD utility to unload the data from the tables to disk (image copy) for those selected partitions.

It may be determined in step 209 whether the source partition to be archived is synchronized with a corresponding partition in the target table. In response to determining that the source partition to be archived is synchronized with a corresponding partition in the target table, data in the source partition may be removed in step 211 from the source table. This may result in an empty source partition whose corresponding/removed data are archived at the target database system. As indicated in FIG. 2, the determining step 209 may, for example, be repeated in case the source partition is not synchronized with the corresponding partition.

Figure 3:
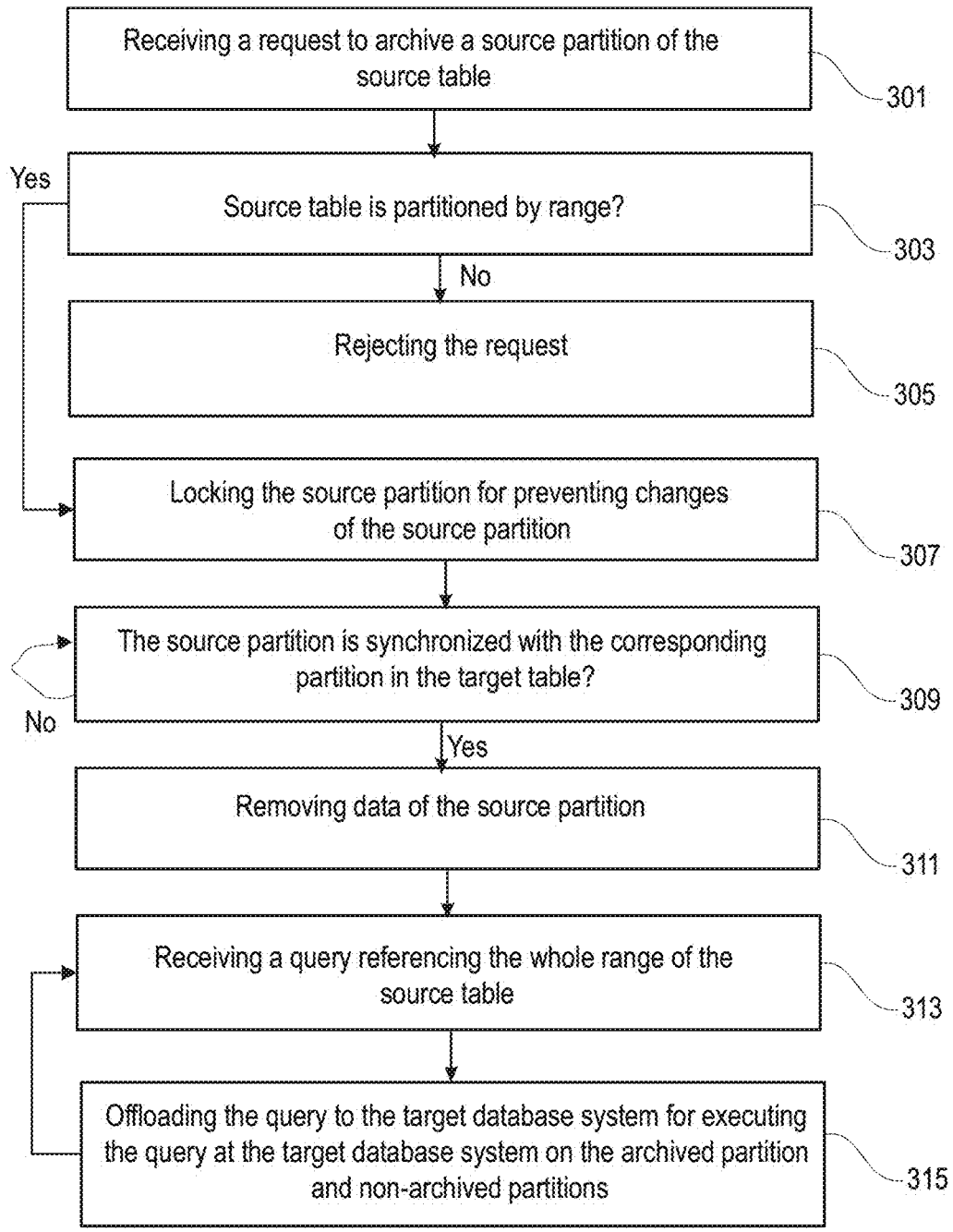
FIG. 3 is a flowchart of a method for archiving a table partition in accordance with an example of the present subject matter.

FIG. 3 is a flowchart of an illustrative method for archiving a table partition in a data analysis system in accordance with an example of the present subject matter. For the purpose of explanation, the method described in FIG. 3 may be implemented in the system illustrated in FIG. 1 but is not limited to this implementation. The method of FIG. 2 may, for example, be performed by the source database system 101 and the target database system 121.

FIG. 3 includes steps 301 to 311 which are the steps 201 to 211 of FIG. 2 respectively. One or more queries referencing the whole range of the source table may be received in step 313. The query may be offloaded in step 315 to the target database system for executing the query at the target database system on the archived partition and non-archived partitions.

Figure 4:
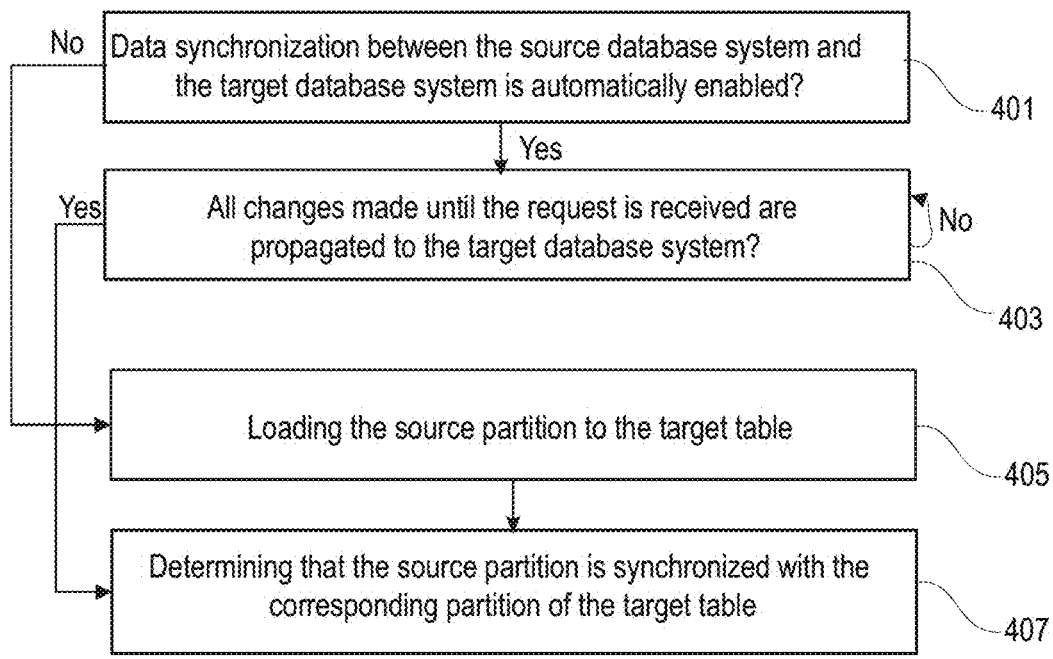
FIG. 4 is a flowchart of data synchronization in a data analysis system in accordance with an example of the present subject matter.

FIG. 4 is a flowchart of data synchronization in a data analysis system in accordance with an example of the present subject matter. For the purpose of explanation, the method described in FIG. 4 may be implemented in the system illustrated in FIG. 1, but is not limited to this implementation. The method of FIG. 4 may, for example, be performed by the source database system 101. The method of FIG. 4 may provide an example implementation of step 209 of FIG. 2.

It may be determined in step 401 whether the data synchronization between the source database system and the target database system is automatically enabled.

In embodiments, in response to determining that the automatic data synchronization between the source database system and the target database system is enabled, it may then be determined in step 403 whether all changes made until the request is received are propagated to the target database system. If all changes made until the request is received are propagated to the target database system, it may be determined in step 407 that the source partition is synchronized with corresponding partition of the target table.

In embodiments, if the automatic data synchronization between the source database system and the target database system is not enabled, then the source partition may be loaded in step 405 to the target database system, thereby determining in step 407 that the source partition is synchronized with the corresponding partition of the target table.

For example, when an administrator wants to archive a portion of data from the source DMBS, the administrator may trigger an archive operation where the source table to be archived is locked and a timestamp of latest commit is sent to the target system so the target can wait and notify the source that the last update has been replicated. This may provide a difference with existing art because of the usage of data replication in conjunction with data archiving capability.

Figure 5:
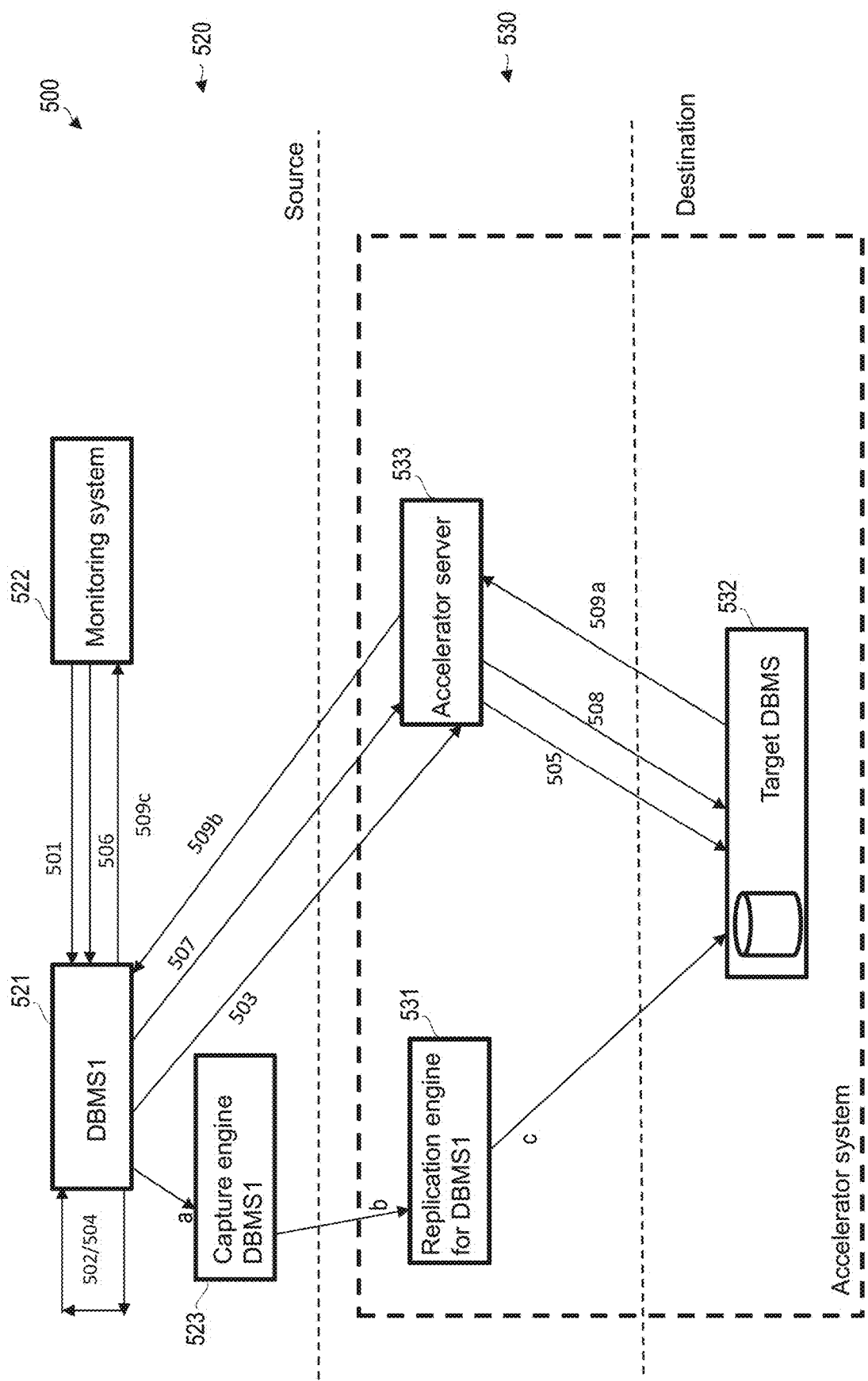
FIG. 5 is a diagram illustrating a method for archiving a table partition in accordance with an example of the present subject matter.

FIG. 5 depicts a diagram illustrating an illustrative method for archiving a table partition in data analysis system 500 in accordance with at least one presently described embodiment. The data analysis system 500 may include a source database system 520 and a target database system 530. The source database system 520 includes DBMS1 521, a monitoring system 522 and a capture engine 523. The target database system 530 includes a replication engine 531 for the DBMS1 521, a target DBMS 532 and an accelerator server 533.

In step 501, the monitoring system 522 may issue archive command to archive one or more partitions for a range-partitioned table. In step 502, the source DBMS1 521 may lock the table partitions to avoid further updates and run UNLOAD utility to unload data for partitions to archive. In step 503, replication timestamp may be validated on target DBMS 532 and all data activity of the source table may be ensured prior to issuing archive is replicated to target. If replication was not set up prior to archive, a Load/Reload on the target DBMS 532 may be initiated. In step 504, the source DBMS1 521 may purge the table partition on DBMS1 521, mark as read only and unlock the partitions. In step 505, a new view may be created on target for the active partition and a new view for full table data may be created. If the replication is enabled, data in target may already be in sync with source. In step 506, a query to get table data may be received. In step 507, the query may be sent to target. In step 508, full table view may be queried if the query requires active and archived data. If the query requires data only from active partition, the active view may be queried. With steps 509a/509b/509c data may be returned to the requestor in response to the query. a, b and c may indicate the continuous, async data replication process from source to target and the data capture engine and replication engine orchestrate the process. The active table partitions continue to receive updates through replication ensuring the active and archive view has current data at all times for unarchived partitions that get updates on the source DBMS.

FIG. 6 depicts a diagram illustrating an exemplary method for archiving table partitions in a data analysis system e.g., 100, in accordance with at least one described embodiment. Different stages are shown describing the evolution over time of the method.

FIG. 6 shows at the first stage, Stage 1, a source table 601.1 of a source database system and corresponding target table 602.1 of the target database system. The source table 601.1 includes six partitions P1, P2, P3, P4, P5 and P6.

During the second stage, stage 2, an archive request for arriving the partitions P1 and P2 may be received at the source database system. In response to that request, the source database system may lock the two partitions P1 and P2 and may create an image copy 603 of the two partitions. This may result in the source table 601.2 as shown in FIG. 6. Upon receiving the archive request, it may be checked whether all changes made until the archive request is received is propagated to the target table e.g., it may be checked whether the automatic data synchronization is enabled. For example, if the automatic data synchronization is turned ON, the source database system and target database system are in sync. If the automatic data synchronization turned OFF, when the archive received is received, a full LOAD/RELOAD of the source table data for P1, P2 may be performed to the target table. This is shown in FIG. 6 where dashed cells in the target table 602.2 indicate that it is synchronized with the locked source table 601.2 after the archive request is received.

Since the two tables 601.2 and 602.2 are synchronized, the source database system may remove in the third stage, Stage 3, the data of the source partitions P1 and P2. The source partitions P1 and P2 may be unlocked 601.3 and only read requests may be allowed for these two partitions P1 and P2. That is, the two partitions are read-only in the third stage. The target database system may create during the third stage the first database view 604 that represents the non-archived partitions P3, P4, P5 and P6 and the second database view 605 that represents both the archived partitions P1 and P2 the non-archived partitions P3, P4, P5 and P6. This means that without having to explicitly execute an archive command as usual and to provide an archive storage at the source database system, the presently described methods makes use of replicated data in the target database system as an archive version of the data in the source database system.

Figure 7:
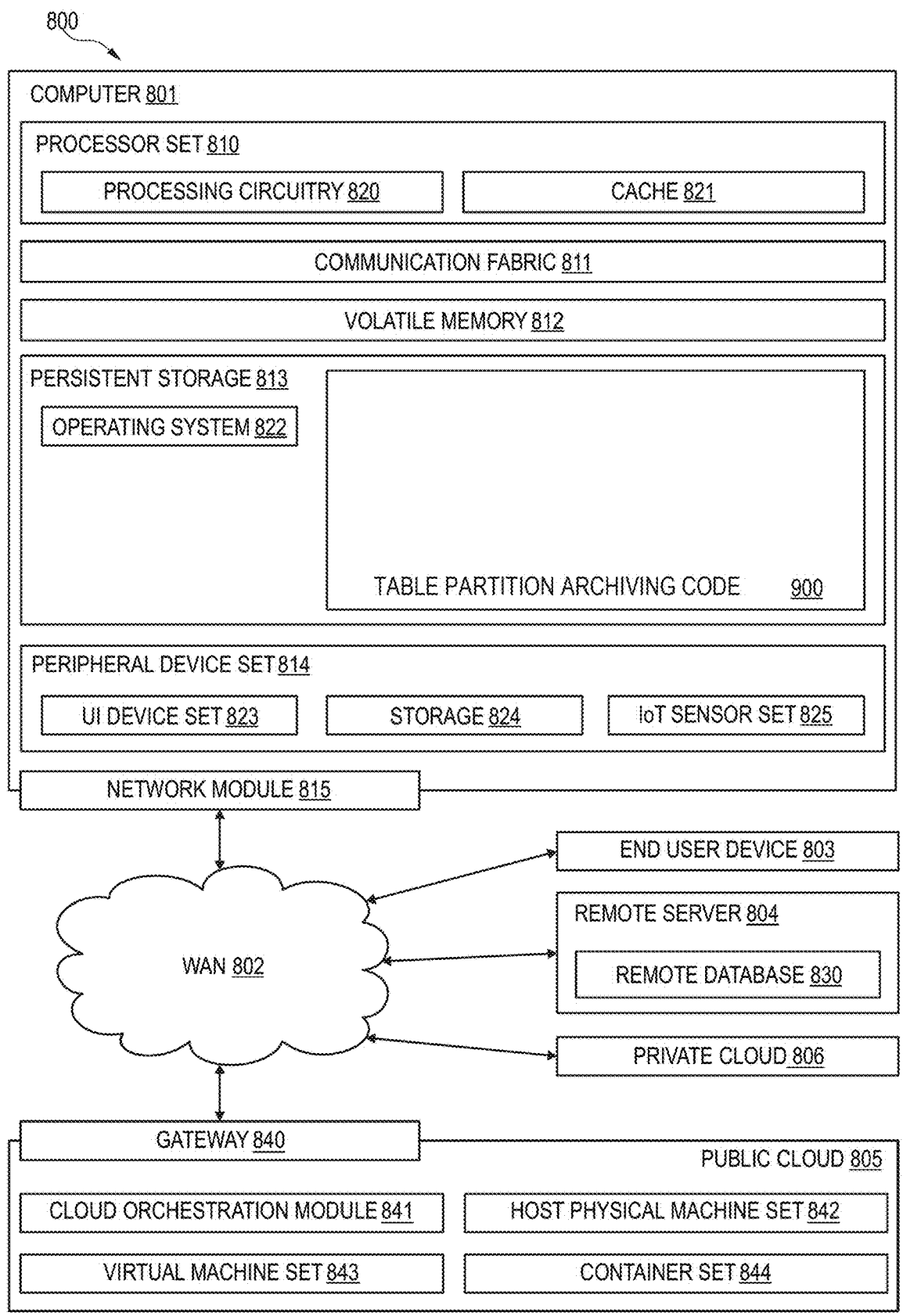
FIG. 7 is a computing environment according to an example of the present subject matter.

Referring now to FIG. 7, a computing environment 800 contains an example of an environment for the execution of at least some of the computer code involved in performing presently described methods, such as a table partition archiving code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 7. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for archiving data in a data analysis system, the data analysis system comprising a source database system and a target database system, the source database system comprising a source table, the source table being partitioned into source partitions by ranges of an attribute of the source table, the target database system comprising a target table corresponding to the source table, wherein a data synchronization in the data analysis system enables a replication of data of the source table from the source database system to the target database system; the method comprising:
   receiving a request to archive a source partition of the source table;
   determining whether the source table is partitioned into partitions by ranges of an attribute of the source table;
   in response to determining that the source table is partitioned by range, locking the source partition to prevent changes of the source partition;
   determining whether the source partition is synchronized with a corresponding partition in the target table;
   in response to determining that the source partition is synchronized with the corresponding partition in the target table, removing data of the source partition from the source table;
   receiving a query referencing a whole range of the source table;
   offloading the received query to the target database system for executing the received query at the target database system on the target table that comprises archived and non-archived partitions of the source table; and
   creating at the target database system a first database view representing the non-archived partitions, and a second database view representing the archived and the non-archived partitions, wherein execution of the received query is performed using the second database view.

2. The method of claim 1, wherein each of the first and the second database views are associated with predicates to indicate whether each of the database views has archived partitions, wherein the execution of the received query is performed using the predicates.

3. The method of claim 1, wherein the first database view is created upon receiving an archive request and before creating the second database view.

4. The method of claim 1, wherein the second database view is created in response to removing data of the source partition.

5. The method of claim 1, wherein determining whether the source partition is synchronized with the corresponding partition of the target table further comprises:
   determining whether the data synchronization between the source database system and the target database system is automatically enabled;
   in response to determining that the automatic data synchronization between the source database system and the target database system is enabled, determining whether all changes made to the source table until the request is received are propagated to the target database system; and
   in response to determining that the automatic data synchronization between the source database system and the target database system is not enabled, loading the source partition to the target database system, thereby determining that the source partition is synchronized with the corresponding partition of the target table.

6. The method of claim 5, wherein determining whether all the changes made until the request is received are propagated to the target database system further comprises:
    sending a timestamp of a latest commit of the source table to the target database system;
    receiving a synchronization confirmation from the target database system in response to sending the timestamp; and
    in response to receiving the synchronization confirmation, determining that the source table is synchronized with the target table.

7. The method of claim 1, further comprising:
    receiving a query referencing non-archived partitions of the source table; and
    executing the received query in the source database system on the non-archived partitions or offloading the received query to the target database system for executing the received query at the target database system on the non-archived partitions.

8. The method of claim 1, wherein locking the source partition to prevent changes of the source partition further comprises:
    creating an image copy of the source partition for enabling a recovery of the source table.

9. The method of claim 1, wherein removing the data of the source partition from the source table further comprises:
    performing a purge operation of the source partition;
    unlocking the source partition; and
    marking the source partition as a read-only partition.

10. The method of claim 1, wherein the source database system comprises an online transaction processing (OLTP) system, and the target database system comprises one or more online analytical processing (OLAP) systems.

11. A computer program product for archiving data in a data analysis system, the data analysis system comprising a source database system and a target database system, the source database system comprising a source table, the source table being partitioned into source partitions by ranges of an attribute of the source table, the target database system comprising a target table corresponding to the source table, wherein a data synchronization in the data analysis system enables a replication of data of the source table from the source database system to the target database system, the computer program product comprising:
    one or more computer readable storage media, and program instructions collectively stored on the one or more computer readable storage media that when executed by a processor perform the operations of:
    receiving a request to archive a source partition of the source table;
    determining whether the source table is partitioned into partitions by ranges of an attribute of the source table;
    in response to determining that the source table is partitioned by range, locking the source partition to prevent changes of the source partition;
    determining whether the source partition is synchronized with a corresponding partition in the target table;
    in response to determining that the source partition is synchronized with the corresponding partition in the target table, removing data of the source partition from the source table;
    receiving a query referencing a whole range of the source table;
    offloading the received query to the target database system for executing the received query at the target database system on the target table that comprises archived and non-archived partitions of the source table; and
    creating at the target database system a first database view representing the non-archived partitions, and a second database view representing the archived and the non-archived partitions, wherein execution of the received query is performed using the second database view.

12. The computer program product of claim 11, wherein each of the first and the second database views are associated with predicates to indicate whether each of the database views has archived partitions, wherein the execution of the received query is performed using the predicates.

13. The computer program product of claim 11, wherein the first database view is created upon receiving an archive request and before creating the second database view.

14. The computer program product of claim 11, wherein the second database view is created in response to removing data of the source partition.

15. A computer system for archiving data in a data analysis system, the data analysis system comprising a source database system and a target database system, the source database system comprising a source table, the source table being partitioned into source partitions by ranges of an attribute of the source table, the target database system comprising a target table corresponding to the source table, wherein a data synchronization in the data analysis system enables a replication of data of the source table from the source database system to the target database system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is configured to perform a method comprising:
    receiving a request to archive a source partition of the source table;
    determining whether the source table is partitioned into partitions by ranges of an attribute of the source table;
    in response to determining that the source table is partitioned by range, locking the source partition for preventing changes of the source partition;
    determining whether the source partition is synchronized with a corresponding partition in the target table;
    in response to determining that the source partition is synchronized with the corresponding partition in the target table, removing data of the source partition from the source table;
    receiving a query referencing a whole range of the source table;
    offloading the received query to the target database system for executing the received query at the target database system on the target table that comprises archived and non-archived partitions of the source table; and
    creating at the target database system a first database view representing the non-archived partitions, and a second database view representing the archived and the non-archived partitions, wherein execution of the received query is performed using the second database view.

16. The computer system of claim 15, wherein the target database system is configured to create a first database view representing the non-archived partitions, and a second database view representing the archived partitions and non-archived partitions.

17. The computer system of claim 15, wherein locking the source partition for preventing the changes of the source partition further comprises:

creating an image copy of the source partition for enabling a recovery of the source table.

18. The computer system of claim 15, wherein removing the data of the source partition from the source table further comprises:

performing a purge operation of the source partition; and unlocking the source partition and marking the source partition as a read-only partition.

19. The computer system of claim 15, wherein determining whether the source partition is synchronized with the corresponding partition in the target table in the target database system further comprises:

determining whether the data synchronization between the source database system and the target database system is automatically enabled;

in response to determining that the automatic data synchronization between the source database system and the target database system is enabled, determining whether all changes made to the source table until the request is received are propagated to the target database system; and in response to determining that the automatic data synchronization between the source database system and the target database system is not enabled, loading the source partition to the target database system, thereby determining that the source partition is synchronized with the corresponding partition of the target table.

20. The computer system of claim 15, wherein the source database system comprises an online transaction processing (OLTP) system, and the target database system comprises one or more online analytical processing (OLAP) systems.

* * * * *